United States Patent [19]

Peterson

[11] 4,402,640

[45] Sep. 6, 1983

[54] CLINCH NUT FOR PLASTIC PANELS

[75] Inventor: Francis C. Peterson, St. Charles, Ill.

[73] Assignee: Illinois Tool Works Inc., Chicago, Ill.

[21] Appl. No.: 197,844

[22] Filed: Oct. 17, 1980

[51] Int. Cl.³ .............................................. F16B 37/04
[52] U.S. Cl. .................... 411/112; 264/249;
411/175; 411/527
[58] Field of Search ............... 411/112, 111, 103, 175,
411/174, 173, 172, 524, 525, 526, 527, 528, 176,
177, 181, 182, 184, 186, 189; 264/229, 249, 68

[56] References Cited

U.S. PATENT DOCUMENTS

| 2,197,220 | 4/1940 | Kost | 411/528 |
|---|---|---|---|
| 2,397,251 | 3/1946 | Eggert | 411/524 |
| 2,417,262 | 3/1947 | Morehouse | 411/527 X |
| 2,775,917 | 1/1957 | Ferguson | 411/527 |
| 2,904,820 | 9/1959 | Flora | 411/176 X |
| 3,217,773 | 11/1965 | Munse | 411/175 |
| 3,264,699 | 8/1966 | Knowlton | 411/527 X |
| 3,491,183 | 1/1970 | Brow | 264/249 |

Primary Examiner—Ramon S. Britts
Attorney, Agent, or Firm—David I. Roche; Thomas W. Buckman

[57] ABSTRACT

A sheet metal clinch nut configured to be attached to a plastic panel. A portion of the plastic panel is extruded into a toothed aperture without puncturing the plastic to axially and rotationally fix the clinch nut to the panel. A plurality of embodiments are disclosed as is the method of assembling these clinch nuts to the plastic panel. Also a method of feeding an interconnected strip of clinch nuts and breaking off the lead nut at the staking station is described.

7 Claims, 11 Drawing Figures

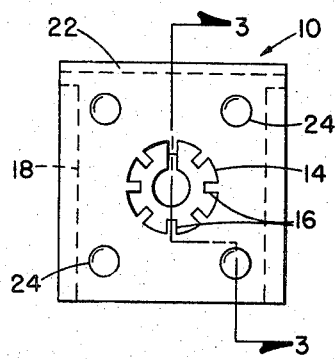
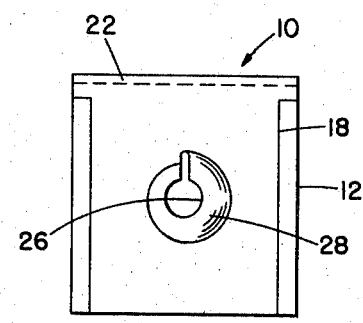
FIG.1  FIG.2
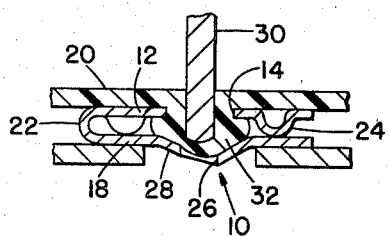
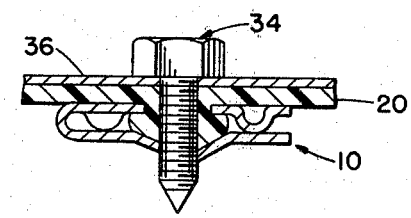
FIG.3  FIG.4
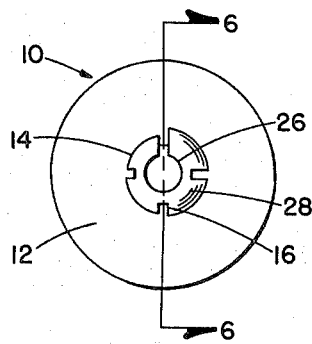
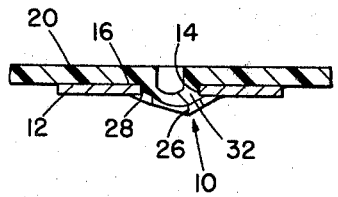
FIG.5  FIG.6

CLINCH NUT FOR PLASTIC PANELS

BACKGROUND AND SUMMARY OF THE INVENTION

The present invention is directed to additional embodiments of clinch nuts such as those described and claimed in U.S. patent application Ser. No. 118,300 (hereinafter the '300 application). More particularly, the present invention is directed to sheet metal clinch nuts particularly adapted for being secured to plastic panels and the like. Because of the relationship between the '300 application and the present application, the former application is hereby incorporated by reference.

While the '300 application clinch nut is for attachment and use with thin metal panels, the clinch nut of the present invention is for thin plastic panels. An example where the clinch nut of the present invention can be particularly suited for use is in the liners for refrigerators. The interior liner or wall of the refrigerator is a one piece plastic member which can be vacuum formed, for example. The liner is inserted and attached to the refrigerator casing and then insulation is foamed-in-place between the inner and outer walls. Subsequently, shelf and drawer supports, light fixtures and other accessories must be affixed to the interior of the liner. Some type of metal fastening member is necessary to backup the plastic so as to distribute the load and prevent the fastener from pulling out of the plastic.

Conventional clinch nuts, and even those of the '300 application, require the panel to be punctured to effect attachment to the panel. Such throughbores are clearly undesirable in an application such as this, since the foamed insulation would seep through these holes in the refrigerator compartment and not be retained between the two walls.

The present invention overcomes these deficiencies in prior art clinch nuts by providing an inexpensive, sheet metal nut which can be affixed to a thin plastic panel without the need for piercing the plastic. The clinch nut of the present invention has an aperture and a recess particularly adapted to receive an extruded portion of the plastic panel and retain the nut against axial and rotational displacement with respect to the panel. The aperture is configured such that the panel need not be punctured, which makes it especially useful in applications such as that previously noted. Novel methods of staking a clinch nut to a plastic panel and installing the lead nut of a continuous strip of clinch nuts are also disclosed.

Various other features, objects and advantages of the present invention will become apparent following a reading of the following detailed description when taken in conjunction with the accompanying drawings.

BRIEF DESCRIPTION OF THE DRAWINGS

FIG. 1 is a top view of one embodiment of the clinch nut of the present invention;

FIG. 2 is a bottom view of the clinch nut shown in FIG. 1;

FIG. 3 is a cross-sectional view taken along line 3—3 of FIG. 1 showing the clinch nut being assembled to a plastic panel;

FIG. 4 is a cross-sectional view similar to FIG. 3 showing the clinch nut with a fastener attaching a shelf bracket to the plastic panel;

FIG. 5 is a top view of a second embodiment of the clinch nut of the present invention;

FIG. 6 is a cross-sectional view taken along line 6—6 in FIG. 5 showing the clinch nut assembled to the panel;

DETAILED DESCRIPTION OF THE PREFERRED EMBODIMENTS

Figure 7:
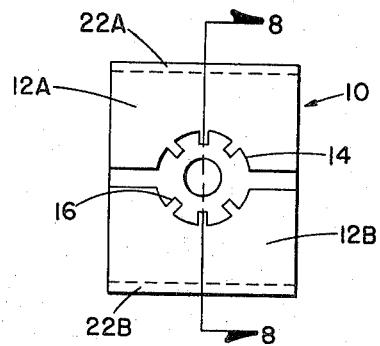
FIG. 7 is a top view of yet a third embodiment of the clinch nut of the present invention.

A first embodiment of the clinch nut of the present invention is depicted in FIGS. 1-4 generally at 10. A first or upper, generally planar arm 12 is adapted to be positioned adjacent plastic panel 20. This arm has an aperture 14 extending therethrough with a plurality of teeth 16 projecting inwardly. A second substantially planar arm 18 extends generally parallel to the first arm and is interconnected thereto by portion 22. Arms 12 and 18 are spacially separated and this separation is maintained by a plurality of protrusions 24 which are punched out of arm 12. A second aperture 26 is formed in arm 18 along the innermost edge of spiral section 28 which is pushed out of the plane of arm 18.

As seen in FIG. 3, a clinch nut 10 is positioned and supported beneath plastic panel 20 in the position desired. A punch 30 is then brought into contact with the upper surface of the panel (as seen in FIG. 3) extruding the plastic material downwardly through aperture 14. Protrusions 24 maintain the arms 12 and 18 in a spaced condition giving the plastic material a space into which it can flow. This plastic extrusion 32 flows between and beneath teeth 16 locking the nut 10 to panel 20 both axially and rotationally. Fastener 34 may be inserted subsequently to attach a shelf support 36 to the liner as shown in FIG. 4. The helical path on the periphery of aperture 26 is configured to increase thread engagement with fastener 34.

A second embodiment of the clinch nut of the present invention is shown in FIGS. 5 and 6 generally at 10. The clinch nut of this embodiment is made from a single thickness of sheet metal and may have a circular shape if desired. Teeth 16 are maintained substantially in the plane of arm 12 while portion 28 is pushed outwardly into a generally helical configuration. The inner periphery in the plane of arm 12 forms the first aperture 14 while the second aperture 26 is, again, formed along the inner edge of helical portion 28. This embodiment functions in a manner similar to that of the FIGS. 1-4 embodiment. Note, protrusions 24 become unnecessary in this embodiment since the nut 10 will be supported by the planar portions of arm 12 during staking so that there will be no tendency for the extrusion-receiving recess to collapse.

Figure 8:
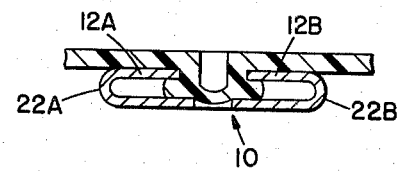
FIG. 8 is a cross-sectional view taken along line 8—8 in FIG. 7 showing the clinch nut assembled to the panel.

Still a third embodiment is depicted in FIGS. 7 and 8 generally at 10. In this embodiment, the first arm is comprised of two substantially coplanar portions 12a and 12b. Aperture 14 and its teeth 16 are formed along adjacent edges of these arm portions 12a and 12b and there are two interconnecting portions 22a and 22b. These two portions strengthen the two arms and, as in the previous embodiment, make the use of spacing protrusions unnecessary for many applications.

Figure 9:
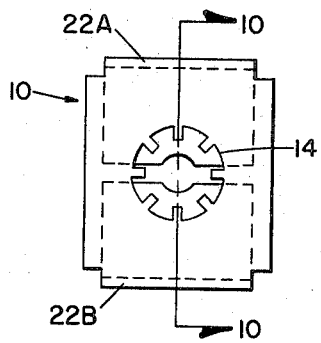
FIG. 9 is a top view of still a fourth embodiment of the clinch nut of the present invention.
Figure 10:
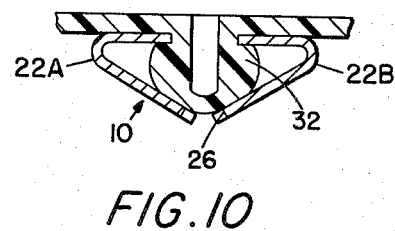
FIG. 10 is a cross-sectional view taken along line 10—10 in FIG. 9 showing the clinch nut assembled to the panel.

Yet, a fourth embodiment is shown in FIGS. 9 and 10 generally at 10. It is similar to the previous embodiment in that it has two interconnecting portions 22a and 22b. However, in this embodiment, it is the second aperture 26 rather than the first aperture 14 which is formed by the adjacent edges.

Figure 11:
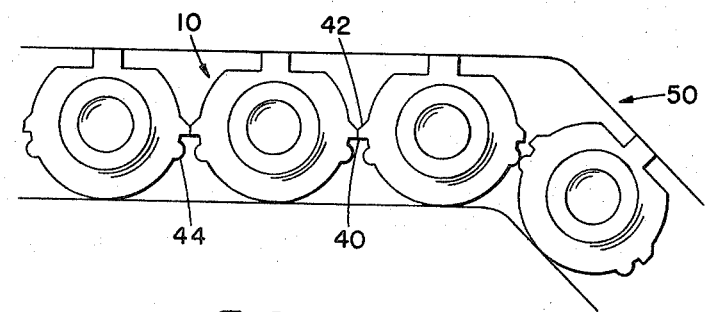
FIG. 11 is a schematic top view depicting a method of feeding a strip of interconnected clinch nuts.

FIG. 11 shows a novel method of feeding clinch nuts to be staked. A plurality of clinch nuts 10 are interconnected in a continuous strip by narrow fingers 40. These fingers may have V-notches 42 on one or both sides, the embodiment depicted in FIG. 11 showing notches on the one side only. On the opposite side are a pair of protrusions 44.

The strip of clinch nuts 10 is fed axially by a machine (not shown), such as that described in application Ser. No. 118,300, for example. As the leading nut reaches the staking station 50 it is deflected angularly with respect to and in the same plane as the rest of the nuts in the strip. As shown, the angle of deflection is forty-five degrees, although this angle may be greater or smaller. Protrusions 44 on this and the adjacent nut make contact insuring complete breakage of the finger 40. Leading nut 10 is then completely separated and in position to be staked to a panel as described in the aforementioned application. Although the method has been described in conjunction with a round clinch nut, of course the method is applicable to clinch nuts of whatever shape desired.

Although the invention has been described in conjunction with a number of preferred embodiments, various changes, alterations and modifications will become apparent following a reading of the foregoing application. Accordingly, it is intended that all such changes, alterations and modifications as come within the scope of the appended claims be considered as part of the present invention.

I claim:

1. A sheet metal clinch nut for use with a plastic panel and a threaded fastener said clinch nut comprising a first generally planar arm member positionable adjacent the plastic panel; a first aperture in said generally planar arm member for receiving an extruded, unpunctured portion of said plastic panel; means for engaging the extruded plastic portion to prevent rotational and axial displacement of the clinch nut relative to said plastic panel; a substantially convex section displaced outwardly from the generally planar arm member to form an extrusion-receiving recess, said section adapted to direct the flow of extruded plastic of said panel into engagement with said means, said section having a second aperture adapted to receive and threadingly engage the shank of the threaded fastener after a leading end of said fastener has punctured the plastic extrusion and passed into said second aperture.

2. The clinch nut of claim 1 wherein said second aperture is formed in a second generally planar arm member extending generally parallel to, and which is interconnected with, said first generally planar arm member.

3. The clinch nut of claim 2 wherein said first and second generally planar arms are spacially separated and said clinch nut includes means to maintain that spacial separation.

4. The clinch nut of claim 1 wherein the first aperture is formed between two co-planar, non-intersecting portions which comprise the first arm member.

5. The clinch nut of claim 1 wherein the means for engaging the extruded plastic portion comprises a plurality of inwardly projecting teeth.

6. The clinch nut of claim 5 wherein the second aperture is formed by displacing a portion of the first generally planar arm outwardly in a helical configuration and said teeth are formed by projections which remain generally in the plane of said first generally planar arm.

7. The clinch nut of claim 1 wherein said second aperture is formed between two non-intersecting arms.

* * * * *